United States Patent
Tang

(10) Patent No.: US 10,274,794 B2
(45) Date of Patent: Apr. 30, 2019

(54) BLUE-PHASE LIQUID CRYSTAL PANELS AND MANUFACTURING METHODS OF LIQUID CRYSTAL PANELS THEREOF

(71) Applicant: Wuhan China Star Optoelectronics Technology Co., Ltd., Wuhan, Hubei (CN)

(72) Inventor: Yuejun Tang, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 506 days.

(21) Appl. No.: 14/899,104

(22) PCT Filed: Nov. 27, 2015

(86) PCT No.: PCT/CN2015/095722
§ 371 (c)(1),
(2) Date: Dec. 16, 2015

(87) PCT Pub. No.: WO2017/088158
PCT Pub. Date: Jun. 1, 2017

(65) Prior Publication Data
US 2018/0039142 A1  Feb. 8, 2018

(30) Foreign Application Priority Data

Nov. 23, 2015   (CN) ............................ 2015 1 0822960

(51) Int. Cl.
*G02F 1/1343* (2006.01)
*G02F 1/1335* (2006.01)
(Continued)

(52) U.S. Cl.
CPC ...... *G02F 1/134363* (2013.01); *G02F 1/1341* (2013.01); *G02F 1/133308* (2013.01);
(Continued)

(58) Field of Classification Search
CPC .... G02F 1/1393; G02F 1/1341; G02F 1/1343; G02F 1/134363; G02F 1/133528; G02F 2001/13793
See application file for complete search history.

(56) References Cited

U.S. PATENT DOCUMENTS 9,583,737 B2 *  2/2017  Sato .................... H01L 51/5271
2010/0302492 A1 * 12/2010  Kubota ............. G02F 1/134363
                                                        349/138

(Continued)

FOREIGN PATENT DOCUMENTS

CN       102231027 A       11/2011
CN       105093764 A       11/2015
(Continued)

*Primary Examiner* — Dung T Nguyen
(74) *Attorney, Agent, or Firm* — Andrew C. Cheng

(57) ABSTRACT

A blue-phase liquid crystal display panel includes a first substrate and a second substrate parallel to the first substrate. The first substrate is spaced apart from the second substrate. The first substrate includes a first base and a first electrode layer and a second electrode layer arranged close to one side of the second substrate. A first space is arranged between the first electrode layer and the second electrode layer, and a second space is arranged between the second electrode layer and the second substrate, and a channel is configured between the first space and the second space. The first electrode layer cooperatively operates with the second electrode layer to form an electrical field within the first space and a weight of the electrical field is parallel to the first substrate or the second substrate. In addition, a manufacturing method of the blue-phase liquid crystal display panel is disclosed.

12 Claims, 6 Drawing Sheets

(51) Int. Cl.
    *G02F 1/1333*    (2006.01)
    *G02F 1/1341*    (2006.01)
    *G02F 1/139*    (2006.01)
    *G02F 1/137*    (2006.01)

(52) U.S. Cl.
    CPC ...... *G02F 1/133528* (2013.01); *G02F 1/1343* (2013.01); *G02F 1/1393* (2013.01); *G02F 2001/13793* (2013.01)

(56) References Cited

U.S. PATENT DOCUMENTS

| | | | |
|---|---|---|---|
| 2011/0205452 A1* | 8/2011 | Hosaka | G09G 3/3611 348/790 |
| 2013/0148048 A1* | 6/2013 | Hiratsuka | G02F 1/1343 349/38 |
| 2017/0160598 A1 | 6/2017 | Tang et al. | |

FOREIGN PATENT DOCUMENTS

| | | |
|---|---|---|
| CN | 105182651 A | 12/2015 |
| JP | 2007171740 A | 7/2007 |
| KR | 20120069458 A | 6/2012 |

* cited by examiner

BLUE-PHASE LIQUID CRYSTAL PANELS AND MANUFACTURING METHODS OF LIQUID CRYSTAL PANELS THEREOF

BACKGROUND OF THE INVENTION

1. Field of the Invention

The present disclosure relates to liquid crystal display technology, and more particularly to a blue-phase liquid crystal panel and a manufacturing method of blue-phase liquid crystal panels.

2. Discussion of the Related Art

Compared to the conventional liquid crystal materials, the blue-phase liquid crystals are characterized by attributes as below. The response time of the blue-phase liquid crystals is within sub-millisecond, and the blue-phase liquid crystals may be driven at 240 Hz without adopting Over Drive technology. In addition, the field sequential color timing display may be achieved by the blue-phase liquid crystals without the alignment film necessary for common liquid crystal displays. This not only simplify the manufacturing process, but also reduce the cost. Further, the blue-phase liquid crystals are optical isotropy, which results in a wide viewing angle and a better dark state.

Nevertheless, the driving voltage of the blue-phase liquid crystals are too huge. Usually, the blue-phase liquid crystals with enhanced performance, such as material having large Kerr's constant, may be adopted, but a plurality of factors, such as monomer, photo initiator, and synthesis conditions have to be considered when the materials are composited. Thus, the cost of adopting enhanced blue-phase liquid crystal is really high. In addition, an enhanced electrode structure may be adopted.

Currently, the blue-phase liquid crystal display panel can only adopt horizontal electrical field, that is, the display panel cannot adopt the vertical electrical field. It is due to that the blue-phase liquid crystals react as one uniaxial crystal having birefringence when being affected by the electrical field. The direction of the optical axis is parallel to the direction of the electrical field. When being affected by the vertical electrical field, the blue-phase liquid crystals may be stretched upward, and the optical axis is vertical. The polarized light beams entering vertically may not generate birefringence after passing through the blue-phase liquid crystal that have been stretched along the vertical direction, and the phase may not be changed. The polarized state of the polarized light beams, after passing through the blue-phase liquid crystals, is the same with that when the voltage has not been applied to the blue-phase liquid crystal display panel. As such, the grayscale display of the blue-phase liquid crystal display panel cannot be realized by adjusting the vertical electrical field. When being affected by the horizontal electrical field, the blue-phase liquid crystal may generate birefringence with respect to the polarized light beams entering vertically, and thus is capable of displaying images by adjusting the strength of the electrical field. Usually, the blue-phase liquid crystal display panel may be driven by in-plane switching (IPS).

One of the conventional solutions relates to forming electrodes on the ripple-protrusion surfaces, which include concave and convex ripple engaging with each other, between the top and down substrates, and the blue-phase liquid crystals are filled between the two electrode layers. This solution may effectively reduce the driving voltage of the blue-phase liquid crystals. However, the assembling precision with respect to the two substrates is pretty strict. The display performance and the yield rate may be seriously affected when the assembly is not precise enough, which results in serious effect toward the cell thickness of the blue-phase liquid crystal display panel.

SUMMARY

The object of the invention is to provide a liquid crystal display and the outer frame assembly thereof that can be assembled in an efficient way.

In one aspect, a blue-phase liquid crystal display panel includes: a first substrate and a second substrate parallel to the first substrate, the first substrate is spaced apart from the second substrate, the first substrate includes a first base and a first electrode layer and a second electrode layer arranged close to one side of the second substrate, a first space is arranged between the first electrode layer and the second electrode layer, and a second space is arranged between the second electrode layer and the second substrate, and a channel is configured between the first space and the second space; the first electrode layer cooperatively operates with the second electrode layer to form an electrical field within the first space and a component of the electrical field is parallel to the first substrate or the second substrate, the first electrode layer and the second electrode layer constitute a continuous or discontinuous wave structure having a plurality of ripple units, and the ripple unit includes at least one concave and convex first electrode unit and second electrode unit, the first electrode unit belongs to a first electrode layer, and the second electrode unit belongs to a second electrode layer, the channel is a through hole arranged on the second electrode layer, or openings at two ends of the ripple unit defined by the first electrode unit and the second electrode unit; wherein the wave structure is sawtooth-shaped; and a portion of the ripple units is within a transmission display area, and the other portion of the ripple units is within a reflective display area, a first gap is configured between the first electrode layer and the second electrode layer within the reflective display area, a second gap is configured between the first electrode layer and the second electrode layer within the transmission display area, and the first gap is greater than the second gap, driving voltages and inclined angles of the ripple units within the transmission display area and the reflective display area are the same, and phase delays of light beams passing through the ripple units corresponding to the transmission display area and the reflective display area are the same.

In another aspect, a blue-phase liquid crystal display panel includes: a first substrate and a second substrate parallel to the first substrate, the first substrate is spaced apart from the second substrate, the first substrate includes a first base and a first electrode layer and a second electrode layer arranged close to one side of the second substrate, a first space is arranged between the first electrode layer and the second electrode layer, and a second space is arranged between the second electrode layer and the second substrate, and a channel is configured between the first space and the second space; and the first electrode layer cooperatively operates with the second electrode layer to form an electrical field within the first space and a component of the electrical field is parallel to the first substrate or the second substrate.

Wherein the first electrode layer and the second electrode layer constitute a continuous or discontinuous wave structure having a plurality of ripple units, and the ripple unit includes at least one first electrode unit and second electrode unit, the first electrode unit and the second electrode are configured to be concave-shaped and convex-shaped to engage with each other, the first electrode unit belongs to a first electrode layer, and the second electrode unit belongs to a second electrode layer, the channel is a through hole arranged on the second electrode layer, or openings at two ends of the ripple unit defined by the first electrode unit and the second electrode unit.

Wherein the wave structure is sawtooth-shaped.

Wherein at least one ripple unit is within a transmission display area, and the other ripple units are within a reflective display area, a first gap is configured between the first electrode layer and the second electrode layer within the reflective display area, a second gap is configured between the first electrode layer and the second electrode layer within the transmission display area, and the first gap is greater than the second gap, driving voltages and inclined angles of the ripple units within the transmission display area and the reflective display area are the same, and phase delays of light beams passing through the ripple units corresponding to the transmission display area and the reflective display area are the same.

Wherein at least one ripple unit is within a transmission display area, and the other ripple units are within a reflective display area, an inclined angle of the ripple units corresponding to the reflective display area is smaller than the inclined angle of the ripple units corresponding to the transmission display area, driving voltages of the ripple units corresponding to the transmission display area and the reflective display area are the same, a first gap is configured between the first electrode layer and the second electrode layer within the reflective display area, a second gap is configured between the first electrode layer and the second electrode layer within the transmission display area, and the first gap equals to the second gap, and phase delays of light beams passing through the ripple units corresponding to the transmission display area and the reflective display area are the same.

Wherein a portion of the ripple unit is a transmission display area, and the other portion of the ripple unit is a reflective display area, a first gap is configured between the first electrode layer and the second electrode layer within the reflective display area, a second gap is configured between the first electrode layer and the second electrode layer within the transmission display area, and the first gap is greater than the second gap, driving voltages and inclined angles within the transmission display area and the reflective display area are the same, and phase delays of light beams passing through the transmission display area and the reflective display area are the same.

Wherein a portion of the ripple unit is a transmission display area, and the other portion of the ripple unit is a reflective display area, an inclined angle of the ripple unit within the reflective display area is smaller than that within the transmission display area, and driving voltages corresponding to the transmission display area and the reflective display area are the same, a first gap is configured between the first electrode layer and the second electrode layer within the reflective display area, a second gap is configured between the first electrode layer and the second electrode layer within the transmission display area, and the first gap equals to the second gap, and phase delays of light beams passing through the transmission display area and the reflective display area are the same.

Wherein the first substrate further includes a first protrusion structure arranged between the first electrode layer and the first base, and an insulation layer arranged on at least one surface of the second electrode layer.

In another aspect, a manufacturing method of the blue-phase liquid crystal display panels includes: arranging a first electrode layer, and a second electrode layer on a first base in sequence to form the first substrate, and a non-seal first space is arranged between the first electrode layer and the second electrode layer for receiving blue-phase liquid crystals; fixing the second substrate on one side of the first base on which the second electrode layer is formed, arranging a second space between the second electrode layer and the second substrate, and configuring a channel between the first space and the second space; filling the blue-phase liquid crystals into the second space, and the blue-phase liquid crystals enter the first space via the channel; and wherein the first electrode layer cooperatively operates with the second electrode layer to form an electrical field within the first space and a component of the electrical field is parallel to the first substrate or the second substrate.

Wherein the step of arranging a first electrode layer, and a second electrode layer on a first base in sequence to form the first substrate further includes: forming a first protrusion structure on the first base; forming a first electrode layer on a surface of the first protrusion structure; coating photoresist adhesive on the first base, a height of the photoresist adhesive is greater than that of the first protrusion structure; arranging a mask having patterns on the photoresist adhesive, radiating a portion of the mask without patterns by ultraviolet rays along at least two different directions to soften the photoresist adhesive, removing the mask, and stripping the softened photoresist adhesive to form a second protrusion structure, the second protrusion structure is formed by the remaining photoresist adhesive and the second protrusion structure wraps up the first protrusion structure; forming a second electrode layer on a surface of the second protrusion structure; etching a through hole on the second electrode layer and/or etching the first protrusion structure, the first electrode layer, the second protrusion structure, and the second electrode layer to form the opening; and radiating the remaining photoresist adhesive by the ultraviolet rays to remove the remaining photoresist adhesive, the soften photoresist adhesive are discharged via the through hole and/or the opening, and the first base, the first electrode layer and the second electrode layer cooperatively constitute the first substrate.

Wherein before the step of forming the second electrode layer on the surface of the second protrusion structure further includes: forming an insulation layer on the surface of the second protrusion structure; and/or after the step of forming the second electrode layer on the surface of the second protrusion structure, the method further includes: forming the insulation layer on the surface of the second electrode layer.

In view of the above, the first electrode layer and the second electrode layer are arranged on the first base in sequence. The blue-phase liquid crystals are filled into the first space between the first electrode layer and the second electrode layer. The first electrode layer cooperatively operates with the second electrode layer to form an electrical field within the first space and a component of the electrical field is parallel to the first substrate or the second substrate. The electrical fields between the first electrode layer and the second electrode layer are deployed deeply within the blue-phase liquid crystal layer of the first space. The driving voltage may be effectively reduced. In addition, as the first electrode layer and the second electrode layer are arranged on the first base, the precision requirement toward the assembly of the first substrate and the second substrate may be reduced, such that the yield rate may be enhanced.

DETAILED DESCRIPTION OF THE EMBODIMENTS

Embodiments of the invention will now be described more fully hereinafter with reference to the accompanying drawings, in which embodiments of the invention are shown.

Figure 1:
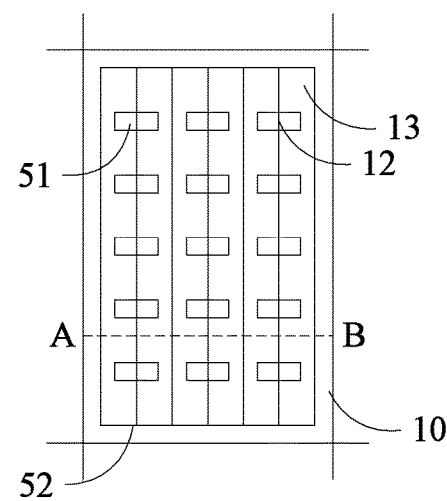
FIG. 1 is a schematic view of the blue-phase liquid crystal panel in accordance with one embodiment.
Figure 2:
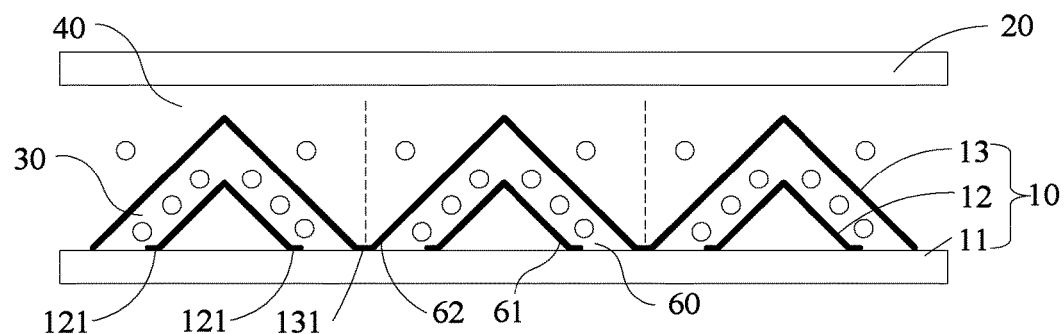
FIG. 2 is a cross-section view of the liquid crystal panel along the A-B line in accordance with one embodiment.

Referring to FIGS. 1 and 2, the blue-phase liquid crystal panel includes a first substrate 10 and a second substrate 20 parallel to the first substrate 10, and the first substrate 10 is spaced apart from the second substrate 20. The first substrate 10 includes a first base 11, a first electrode layer 12, and a second electrode layer 13.

The first electrode layer 12 connects to a driving circuit (not shown) via a first electrode 121. The second electrode layer 13 connects to the driving circuit via the a second electrode 131. The first electrode layer 12 may be the pixel electrode, and the second electrode layer 13 may be the common electrode. Alternatively, the first electrode layer 12 may be the common electrode, and the second electrode layer 13 may be the pixel electrode. The electrode layers, as shown, includes bar-shaped protrusion parallel to the long side of the pixel. The electrode layer may be in other shaped, such as spaced apart bars or blocks. The direction of the electrode layer may configured cooperatively with the polarizers in accordance with real scenario. For instance, the electrode layer may form an included angle of 45 degrees together with a long side of the pixel. In another example, the electrode layer may be parallel to a short side of the pixel.

The first electrode layer 12 and the second electrode layer 13 cooperatively defines a wave structure having a plurality of ripple units 60. The ripple unit 60 includes at least one first electrode unit 61 and second electrode unit 62 engaging with each other. The first electrode unit and the second electrode are configured to be concave-shaped and convex-shaped to engage with each other. The first electrode unit 61 relates to the first electrode layer 12, and the second electrode units 62 relates to the second electrode layer 13. As shown, the three ripple units 60 constitute continuous wave structure. In another example, the wave structure may be discontinuous, and the wave structure may include more or less than three of the ripple units 60. In the embodiment, the wave structure is sawtooth-shaped. In other embodiments, the wave structure may be wedge-shaped, trapezium-shaped, circular-arc-shaped or a combination of other shapes.

A first space 30 is arranged between the first electrode layer 12 and the second electrode layer 13, and a second space 40 is arranged between the second electrode layer 13 and the second substrate 20. The blue-phase liquid crystals are distributed within the first space 30 and the second space 40. A channel is configured between the first space 30 and the second space 40. The channel may be a through hole 51 on the second electrode layer 13 and/or an opening 52 at two ends of the electrode layer. During the manufacturing process of the blue-phase liquid crystal panel, the remaining photoresist adhesive is discharged via the channel. When the liquid crystal are filled, the blue-phase liquid crystals enter the first space 30 via the channel.

A polarizer (not shown) is configured respectively below the first substrate 10 and above the 20 and above the 20, and the polarized directions of the two polarizers are vertical to each other. When the voltage is not applied to the blue-phase liquid crystal panel, the blue-phase liquid crystals may be optical isotropy. After passing through the blue-phase liquid crystals, the polarized direction of the incident light beams are vertical to that of the up polarizer. That is, the incident light beams are unable to pass through the up polarizer, and thus are shown as black.

Figure 3:
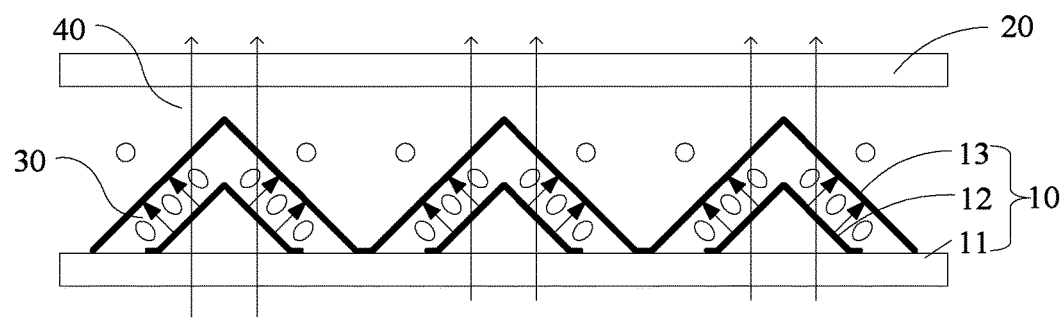
FIG. 3 is a cross-section view of the liquid crystal panel along the A-B line when the liquid crystal panel is electrified in accordance with one embodiment.

As shown in FIG. 3, when the blue-phase liquid crystal panel is applied with the voltage, the first electrode layer 12 cooperatively operates with the second electrode layer 13 such that the an inclined electrical field is formed within the first space 30. The direction of the electrical field is indicated by the arrow within the first space 30, as shown in FIG. 3. As shown, the first electrode layer 12 is at high level, and the second electrode layer 13 is at the low level. In another example, the first electrode layer 12 is at the low level, and the second electrode layer 13 is at the high level. When operating under the inclined electrical field, the blue-phase liquid crystals may be uniaxial crystal having birefringence. The direction of the optical axis is parallel to that of the electrical field. The inclined electrical field may have a component of the horizontal electrical field parallel to the first substrate 10 or the second substrate 20. Under the component of the horizontal electrical field, the blue-phase liquid crystals may generate birefringent with respect to the incident light beams vertical to the first substrate 10. The direction of the light beams is indicated by the arrows extending from the first substrate 10 toward the second substrate 20. The phase of the incident light beams may be changed after passing through the blue-phase liquid crystals via the up polarizer. The effective optical isotropy $\Delta n_{effect}$ of the blue-phase liquid crystals may increase along with the inclined electrical field. The strength of the penetrated light beams also increase at the same time. The light transmission rate may be adjusted by configuring the strength of the electrical field so as to display the grayscale. In addition, colorful display may be achieved by incorporating the color filter film.

In order to enhance the light transmission rate, the included angle formed by the first electrode units 61 and the first substrate is approximately 45 degrees, and the second electrode units 62 is parallel to the first electrode units 61. In order to decrease the driving voltage of the blue-phase liquid crystals to the greatest extent, preferably, the height of the bar-shaped and convex electrode may be configured in accordance with the dimension of the pixels.

With respect to the above solution, the polarized directions of the two polarizers are vertical to each other. When the liquid crystal panel is not electrified, no light beams may pass through the panel, which is called as normally black panels. Alternatively, the polarized directions of the two polarizers may be configured to be parallel to each other. Under the circumstance, when the liquid crystal panel is not electrified, the light beams may pass through the panel. When the liquid crystal panel is electrified, the strength of the penetrated optical beams may decrease while the voltage is increased, which is called as the normally white panels.

In view of the above, the two surface-shaped electrical fields between the first electrode layer 12 and the second electrode layer 13 are deployed deeply within the blue-phase liquid crystal layer of the first space 30. Compared with the conventional IPS electrode, the driving voltage may be effectively reduced. In addition, as the first electrode layer 12 and the second electrode layer 13 are arranged on the first base, the precision requirement toward the assembly of the first substrate 10 and the second substrate 20 may be reduced, such that the yield rate may be enhanced.

Figure 4:
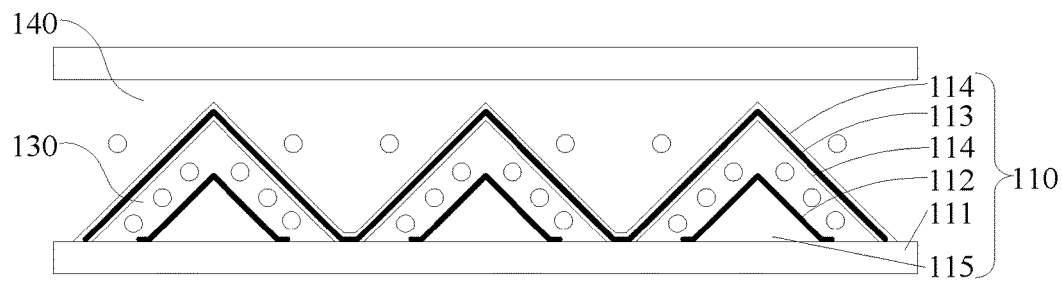
FIG. 4 is a cross-sectional view of the liquid crystal panel in accordance with a first embodiment.

As shown in FIG. 4, in one embodiment, the first substrate 110 further includes an insulation layer 114 and a first protrusion structure 115. The insulation layers 114 are respectively arranged on a top surface and a down surface of the second electrode 113. A portion of the insulation layer 114 corresponding to the through hole is removed. A portion of the insulation layer 114 corresponding to the opening is also removed. In this way, the channel between the first space 130 and the second space 140 is formed. The first protrusion structure 115 is arranged between the lateral side 112 and the first substrate 111.

The insulation layer 114 may be made by material such as resin. The insulation layer 114 supports the second electrode 113. As shown, the top surface and the down surface of the second electrode 113 are configured with the insulation layer 114. In an example, the second electrode 113 may be embedded within the supporting structure formed by the insulation layer 114. In another example, the insulation layer 114 may be arranged on one surface of the second electrode 113.

The first protrusion structure 115 may be made by transparent material, such as SiNx, SiOx, and resin. The first protrusion structure 115 supports the lateral side 112. This embodiment may be combine with any one of the above embodiment of the blue-phase liquid crystal panel.

Figure 5:
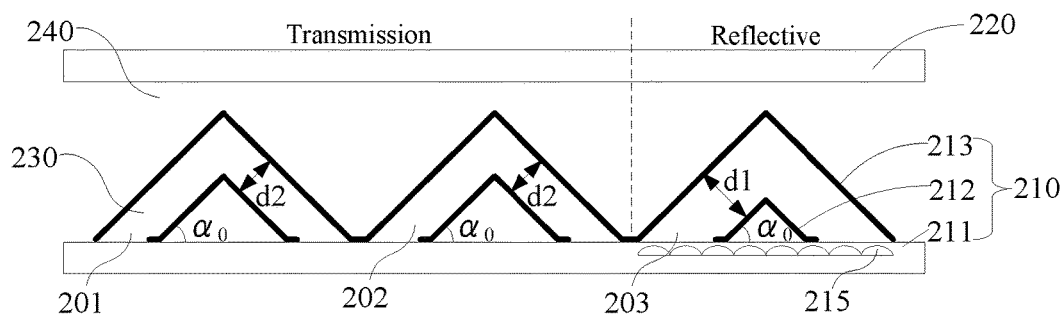
FIG. 5 is a cross-sectional view of the liquid crystal panel in accordance with a second embodiment.

FIG. 5 is a cross-sectional view of the liquid crystal panel in accordance with a second embodiment. The second embodiment bases on the first embodiment. The ripple units 201, 202 are within the transmission display area, and the ripple unit 203 is within the reflective display area. A reflective layer 215 is configured within the first substrate 211, which is below the ripple unit 203 corresponding to the reflective display area. The number of the ripple units within the transmission display area and within the reflective display area may be configured in accordance with requirement.

With respect to ripple unit 203 corresponding to the reflective display area, a first gap between the first electrode layer 212 and the second electrode layer 213 is d1, and a second gap between the first electrode layer 212 and the second electrode layer 213 within the ripple units 201, 202 corresponding to the transmission display area is d2. In addition, the driving voltages of the ripple units 201, 202, and 203 are the same, and the inclined angle of the ripple are $\alpha_0$. The first substrate 211 may further include an insulation layer (not shown) on the top surface and/or the down surface of the second electrode layer 213. The blue-phase liquid crystals are not shown, but it can be understood that the blue-phase liquid crystals are distributed within the first space 230 and the second space 240 by referencing the first embodiment.

The relationship between d1 and d2 may be adjusted such that the phase delay of the light beams passing through the ripple units respectively within the transmission and reflective display area may be the same. With respect to the blue-phase liquid crystals, $\Delta n = n_e - n_0 = \lambda K E^2$, wherein $\lambda$ represents the wavelength of the incident light beams, K represents Kerr's constant, and E represents the strength of the external electrical field. The external electrical field may be viewed as the electrical field between the capacitors of the parallel boards. The external electrical field may be viewed as the electrical field between the parallel capacitor formed by the first electrode layer and the second electrode layer. The strength of the electrical field is $$E = \frac{U}{d_i}.$$

The phase delay of the incident light beams is $T = \Delta n_{effect} d_{effect}$. With respect to the blue-phase liquid crystals, the effective optical isotropy $\Delta n_{effect}$ is the weight of the $\Delta n$ in the horizontal direction, which increases along with the strength of the electrical field. Thus, $\Delta n_{effect}$ may decrease while the gap between the electrodes is increased. At the same time, $d_{effect}$ relates to the distance of the light beams passing through the blue-phase liquid crystals in the vertical direction. Thus, when the inclined angle of the ripple units remains the same and when the gap between the electrode layers is increased, $T = \Delta n_{effect} * d_{effect}$ may decrease. That is, the phase delay of the incident light beams may decrease when the gap between the electrode layers is increased. The incident light beams pass through the reflective display area twice, and only pass through the transmission display area once. In order to keep the phase delay of the ripple units corresponding to the transmission display area and the reflective display area the same, the phase delay of the incident light beams passing through the reflective display area has to be configured to be half of that of the incident light beams passing through the transmission display area, that is, d1>d2. As the direction of the incident light beams passing through the reflective display area is not exactly vertical to a surface of the display panel, the above equation regarding the phase delay has to be adjusted. The precise values of d1, d2, and $\alpha_0$ may be obtained via experiments.

Several predetermined values of d1, d2, and $\alpha_0$ may be adopted to manufacture the testing panels. By selecting the value of d2 to be approximately half of that of d1, the blue-phase liquid crystals are filled into the testing panel. The curves V-T (voltage-transmission rate) of the transmission display area and the reflective display area regarding the several values are drawn. With respect to the same testing panel, the backlight is turned on when there is no ambient light, and the V-T curve of the transmission display area is tested. When the backlight is turned off, the V-T curve of the reflective display area is measured under strong ambient light.

If the margin of errors regarding the curves of the transmission display area and the reflective display area are consistent, it can be deemed that the phase delay of the incident light beams passing through the transmission display area and the reflective display area are the same. Thus, d1 and d2 regarding the testing panel may be reference values for manufacturing processes.

With respect to the ripple units corresponding to the transmission display area and the reflective display area, the dimensions of the second electrode layer 213 are the same. The dimension of the first electrode layer 212 of the ripple units 201, 202 corresponding to the transmission display area is smaller than the ripple unit 203 corresponding to the reflective display area. As such, d2<d1, and the phase delay of the ripple units corresponding to the transmission display area and the reflective display area are the same. Alternatively, the dimensions of the first electrode layer 212 within the transmission display area and the reflective display area are the same, and the dimension of the second electrode layer 213 corresponding to the transmission display area is larger than that corresponding to the reflective display area. As such, d2<d1, and the phase delay requirement is satisfied. Alternatively, the dimensions of the first electrode layer 212 and the second electrode layer 213 within the transmission display area and the reflective display area are different. As such, d2<d1, and the phase delay requirement is satisfied.

In view of the above, the gap between the first electrode layer 212 and the second electrode layer 213 may be adjusted. The display panel includes the ripple units and the ripple units may belong to transmission display area and the reflective display area. The phase delay of the light beams passing through the transmission display area and the reflective display area are the same. The electro-optical characteristics of the transmission display area and the reflective display area are the same to realize transflective display panel. Thus, the display device owns better display performance regardless of the strength of the ambient lights.

Figure 6:
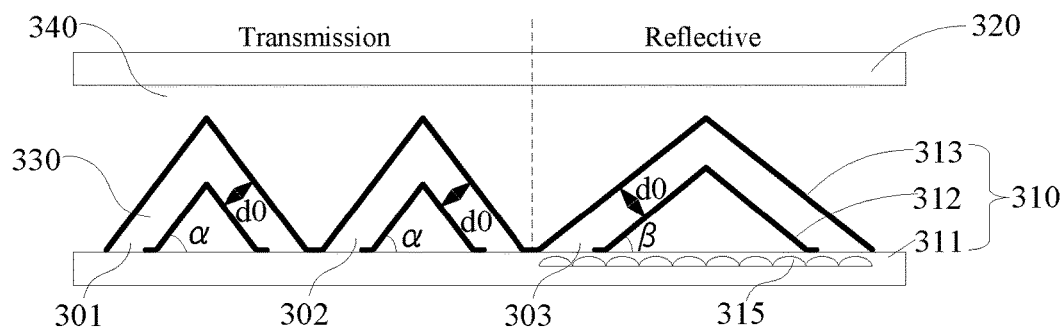
FIG. 6 is a cross-sectional view of the liquid crystal panel in accordance with a third embodiment.

FIG. 6 is a cross-sectional view of the liquid crystal panel in accordance with a third embodiment. The third embodiment bases on the first embodiment. The ripple units 301, 302 are within the transmission display area, and the ripple unit 303 is within the reflective display area. A reflective layer 315 is configured within the first substrate 311, which is below the ripple unit 303 corresponding to the reflective display area. The number of the ripple units within the transmission display area and within the reflective display area may be configured in accordance with requirement.

The inclined angle of the ripple unit 303 corresponding to the reflective display area is $\beta$, and the inclined angle of the ripple units 301, 302 corresponding to the transmission display area is $\alpha$. In addition, the driving voltage of the ripple units 301, 302, 303 are the same. The gap between the first electrode layer 312 and the second electrode layer 313 are the same. The first substrate 310 may further include an insulation layer (not shown) on the top surface and/or the down surface of the second electrode layer 313. The blue-phase liquid crystals are not shown, but it can be understood that the blue-phase liquid crystals are distributed within the first space 330 and the second space 340 by referencing the first embodiment.

The relationship between $\alpha$ and $\beta$ may be adjusted to configure the phase delays of the ripple units corresponding to the transmission display area and the reflective display area the same. Referring to the equations and the calculations illustrated in the second embodiments, the gap between the electrode layers are the same such that $\Delta n = n_e - n_o$ are the same. The smaller included angle between the blue-phase liquid crystal having optical isotropy and the horizontal plane results in larger effective optical isotropy $\Delta n_{effect}$. Thus, when the gaps between the electrode layers are the same, the included angle between the blue-phase liquid crystal having optical isotropy and the horizontal plane is smaller, and thus the phase delay (T) is larger. Generally, the included angle between the blue-phase liquid crystal having optical isotropy and the horizontal plane and the inclined angle of the ripple units are complement angles, that is, $\alpha > \beta$. The values of $\alpha$ and $\beta$ may be configured by the equation calculating the phase delay (T). As the direction of the incident light beams passing through the reflective display area is not exactly vertical to the surface of the display panel, the above equation regarding the phase delay has to be adjusted. The precise values of $\alpha$ and $\beta$ may be obtained via experiments.

Several predetermined values of $\alpha$ and $\beta$ may be adopted to manufacture the testing panels. The same blue-phase liquid crystal are filled into the testing panels. The curves V-T (voltage-transmission rate) of the transmission display area and the reflective display area regarding the several values are drawn.

With respect to the same testing panel, the backlight is turned on when there is no ambient light, and the V-T curve of the transmission display area is tested. When the backlight is turned off, the V-T curve of the reflective display area is measured under strong ambient light.

If the margin of errors regarding the curves of the transmission display area and the reflective display area are consistent, it can be deemed that the phase delay of the incident light beams passing through the transmission display area and the reflective display area are the same. Thus, $\alpha$ and $\beta$ regarding the testing panel may be reference values for manufacturing processes.

The height of the ripple units 301, 302 corresponding to the transmission display area is the same with that of the ripple unit 303 corresponding to the reflective display area. The width of the ripple units 301, 302 is smaller than that of the ripple unit 303 such that $\alpha > \beta$ and the phase delay requirement may be satisfied. Alternatively, the width of the ripple units 301, 302 is the same with that of the ripple unit 303, and the height of the ripple units 301, 302 is larger than that of the ripple unit 303. As such, α>β and the phase delay requirement may be satisfied. Alternatively, the height and the width of the ripple units 301, 302 are different from that of the ripple unit 303. As such, α>β and the phase delay requirement may be satisfied.

In view of the above, the inclined angles of the ripple units 301, 302, and 303 may be adjusted. The display panel includes the ripple units and the ripple units may belong to transmission display area and the reflective display area. The phase delay of the light beams passing through the transmission display area and the reflective display area are the same. The electro-optical characteristics of the transmission display area and the reflective display area are the same to realize transflective display panel. Thus, the display device owns better display performance regardless of the strength of the ambient lights.

Figure 7:
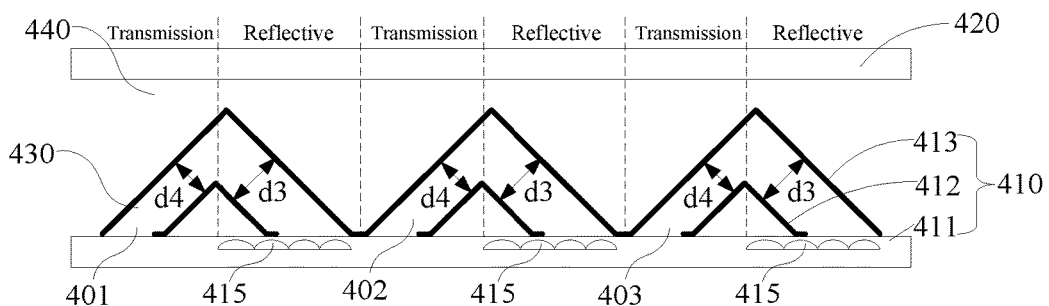
FIG. 7 is a cross-sectional view of the liquid crystal panel in accordance with a fourth embodiment.

FIG. 7 is a cross-sectional view of the liquid crystal panel in accordance with a fourth embodiment. The fourth embodiment bases on the first embodiment. A portion of the ripple units 401, 402, and 403 is within the transmission display area, and the other portion of the ripple units 401, 402, and 403 is within the reflective display area. A reflective layer 415 is configured within the first substrate 411, which is below the reflective display area.

A first gap between the first electrode layer 412 and the second electrode layer 413 within the reflective display area is d3, and a second gap between the first electrode layer 412 and the second electrode layer 413 within the transmission display area is d4, wherein d3>d4, and the driving voltages and the inclined angles of the ripple units with respect to the transmission display area and the reflective display area are the same. The first substrate 210 may further include an insulation layer (not shown) on the top surface and/or the down surface of the second electrode layer 213. The blue-phase liquid crystals are not shown, but it can be understood that the blue-phase liquid crystals are distributed within the first space 430 and the second space 440 by referencing the first embodiment.

The relationship between d3 and d4 may be adjusted such that the phase delay of the light beams passing through the ripple units respectively within the transmission and reflective display area may be the same. The calculations and testing of the relationship between d3 and d4 may be understood by referring to the second embodiment, and thus are omitted hereinafter.

Compared to the second embodiment, the transmission display area and the reflective display area are combined within one ripple unit so as to realize transflective display panel.

Figure 8:
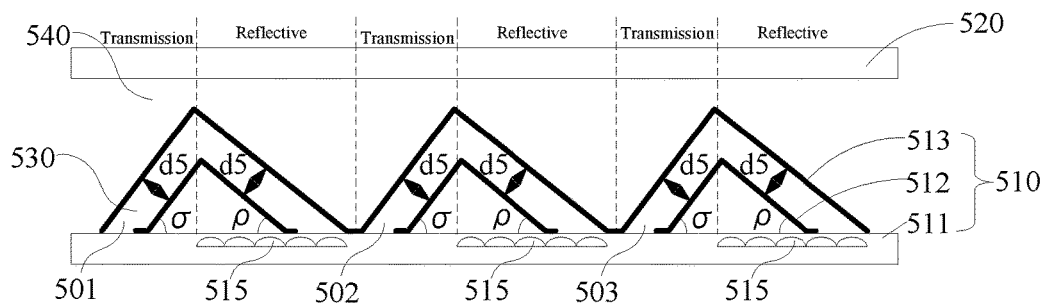
FIG. 8 is a cross-sectional view of the liquid crystal panel in accordance with a fifth embodiment.

FIG. 8 is a cross-sectional view of the liquid crystal panel in accordance with a fifth embodiment. The fifth embodiment bases on the first embodiment. A portion of the ripple units 501, 502, and 503 is within the transmission display area, and the other portion of the ripple units 501, 502, and 503 is within the reflective display area. A reflective layer 515 is configured within the first substrate 511, which is below the reflective display area.

The inclined angle of the ripple unit corresponding to the reflective display area is ρ, and the inclined angle corresponding to the transmission display area is σ, and wherein <σ. In addition, the driving voltage corresponding to the transmission display area and the reflective display area are the same. The gap between the first electrode layer 512 and the second electrode layer 513 within the reflective display area equals to the second gap between the first electrode layer 512 and the second electrode layer 513 within the transmission display area. The first substrate 510 may further include an insulation layer (not shown) on the top surface and/or the down surface of the second electrode layer 513. The blue-phase liquid crystals are not shown, but it can be understood that the blue-phase liquid crystals are distributed within the first space 530 and the second space 540 by referencing the first embodiment.

The relationship between ρ and σ may be adjusted such that the phase delay of the light beams passing through the ripple units respectively within the transmission and reflective display area may be the same. The calculations and testing of the relationship between ρ and σ may be understood by referring to the third embodiment, and thus are omitted hereinafter.

Compared to the third embodiment, the transmission display area and the reflective display area are combined within one ripple unit so as to realize transflective display panel.

Figure 9:
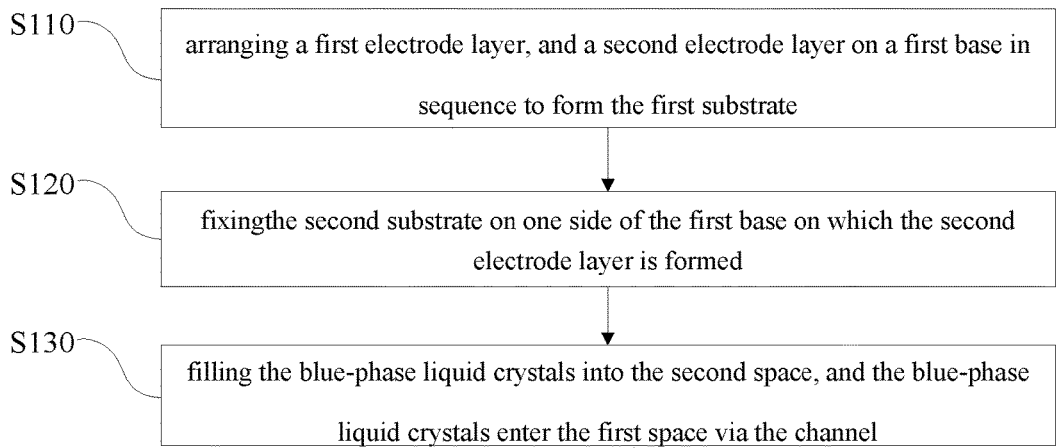
FIG. 9 is a flowchart illustrating the manufacturing method of the blue-phase liquid crystal panel in accordance with the first embodiment.

FIG. 9 is a flowchart illustrating the manufacturing method of the blue-phase liquid crystal panel in accordance with the first embodiment.

In block S110, a first electrode layer, and a second electrode layer are arranged on a first base in sequence to form the first substrate;

A non-seal first space is arranged between the first electrode layer and the second electrode layer for receiving the blue-phase liquid crystals. The first electrode layer 12 may be the pixel electrode, and the second electrode layer 13 may be the common electrode. In another example, the first electrode layer 12 may be the common electrode, and the second electrode layer 13 may be the pixel electrode.

In block S120, the second substrate is fixed on one side of the first base where the second electrode layer is formed.

The second substrate is parallel to the first base, and the second substrate is fixed on the first base via an auxiliary spacer. A second space is arranged between the second electrode layer and the second substrate, and a channel is configured between the first space and the second space.

In block S130, the blue-phase liquid crystals are filled into the second space, and the blue-phase liquid crystals enter the first space via the channel.

The blue-phase liquid crystals are distributed within the first space and the second space. When being electrified, the first electrode layer and the second electrode layer cooperatively operate such that a component of the electrical field is parallel to the first substrate or the second substrate. Under the effect of the electrical field, the blue-phase liquid crystals may generate birefringent with respect to the incident light beams vertical to the first substrate. The phase of the blue-phase liquid crystals may change after the light beams passing through the blue-phase liquid crystals. The strength of the electrical field may be adjusted so as to adjust the light transmission rate and to display images.

In view of the above, the electrical field between the first electrode layer and the second electrode layer are deployed deeply within the blue-phase liquid crystal layer of the first space. Compared with the conventional IPS electrode, the driving voltage may be effectively reduced. In addition, as the first electrode layer and the second electrode layer are arranged on the first base, the precision requirement toward the assembly of the first substrate and the second substrate may be reduced, such that the yield rate may be enhanced.

Figure 10:
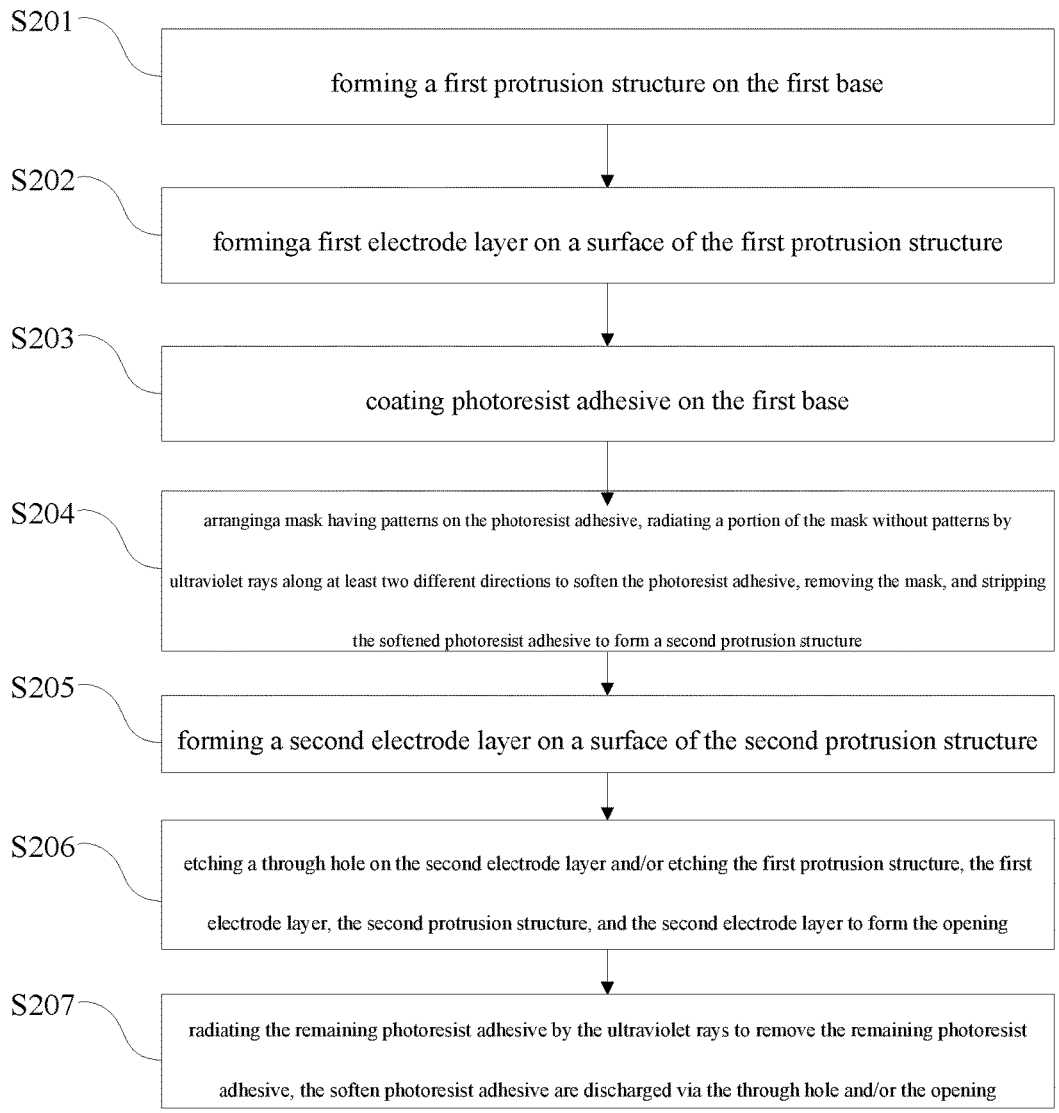
FIG. 10 is a flowchart illustrating the manufacturing method of the blue-phase liquid crystal panel in accordance with the second embodiment.

FIG. 10 is a flowchart illustrating the manufacturing method of the blue-phase liquid crystal panel in accordance with the second embodiment. The manufacturing method bases on the first embodiment. In block S110, a first electrode layer, and a second electrode layer are arranged on a first base in sequence to form the first substrate. The step further includes the following steps.

In block S201, a first protrusion structure is formed on the first base.

Figure 11:
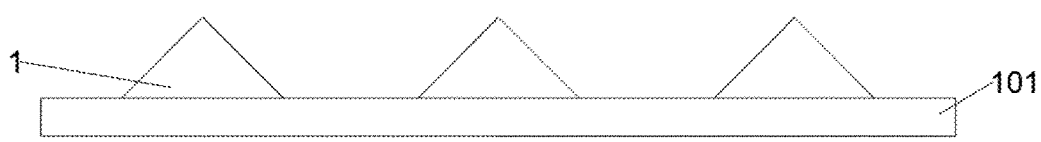
FIG. 11 is a schematic view showing the first protrusion structure formed by the manufacturing method of the second embodiment.

Referring to FIG. 11, the reference numeral 101 represents the first base, the reference numeral represents the first protrusion structure having solid construction. The first protrusion structure may be made by transparent material, such as SiNx, SiOx, and resin.

In block S202, a first electrode layer is formed on a surface of the first protrusion structure.

Figure 12:
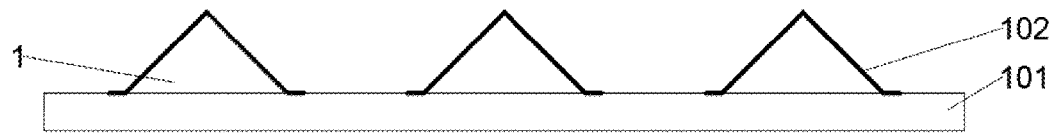
FIG. 12 is a schematic view showing the first electrode layer formed by the manufacturing method of the second embodiment.

Referring to FIG. 12, the reference numeral 102 represents the first electrode layer.

In block S203, the photoresist adhesive is coated on the first base.

Figure 13:
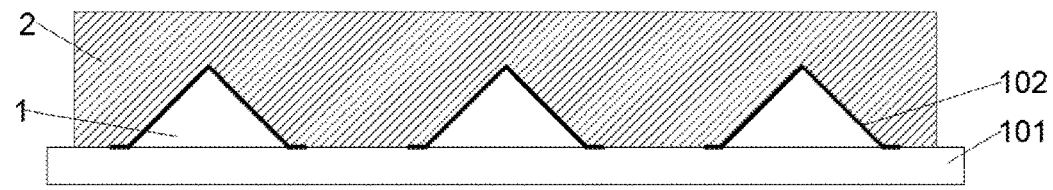
FIG. 13 is a schematic view showing the coated photo-resist adhesive in the manufacturing method of the second embodiment.

Referring to FIG. 13, the reference numeral 2 represents the photoresist adhesive coated on the first base 101 and on the first electrode layer 102. The height of the photoresist adhesive 2 is greater than that of the first protrusion structure 1.

In block S204, a mask having patterns is arranged on the photoresist adhesive. The ultraviolet rays are radiated on the portion of the mask without patterns along at least two different directions so as to soften the photoresist adhesive. The softened photoresist adhesive is removed to form a second protrusion structure.

Figure 14:
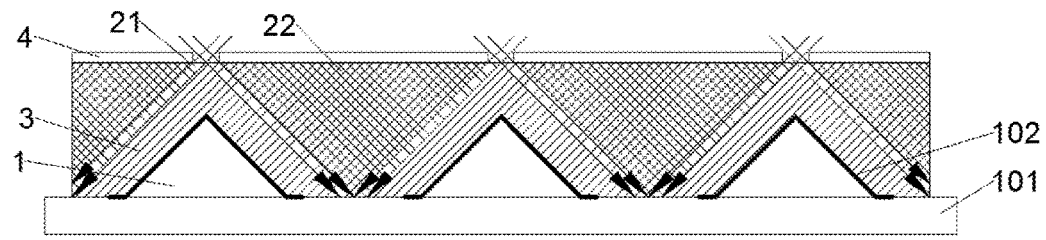
FIG. 14 is a schematic view showing the second protrusion structure formed by the manufacturing method of the second embodiment.

Referring to FIG. 14, the reference numeral 4 represents the mask. The UV rays may radiate the photoresist adhesive 21 through the portion of the protection layer 4 having no pattern along at least two different directions so as to soften the photoresist adhesive 21. Afterward, the protection layer 4 is removed, and developed solution is coated on the radiated photoresist adhesive layer. The deionized water is adopted to flush the photoresist adhesive resolved in the developed solution. At the same time, the un-softened photoresist adhesive 21, which is separated from the bottom portion of the photoresist adhesive layer, is also flushed by the deionized water. The remaining photoresist adhesive constitute the second protrusion structure 3. In addition, the second protrusion structure 3 wraps up the first protrusion structure 1.

In block S205, the second electrode layer is formed on the surface of the second protrusion structure.

Figure 15:
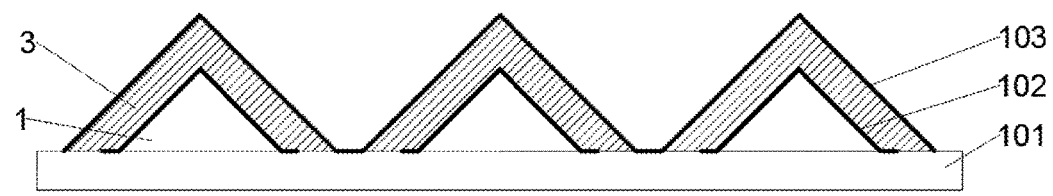
FIG. 15 is a schematic view showing the second electrode layer formed by the manufacturing method of the second embodiment.

Referring to FIG. 15, the reference numeral 103 represents the second electrode layer. The first electrode layer 102 and the second electrode layer 103 constitute the wave structure.

In block S206, etching a through hole on the second electrode layer and/or etching the first protrusion structure, the first electrode layer, the second protrusion structure, and the second electrode layer to form the opening.

Both of the through hole and the opening may be the channel connecting the first space between the first electrode layer 102 and the second electrode layer 103 and the second space between the second electrode layer 103 and the second substrate. The channel is configured for discharging the remaining photoresist adhesive and for filling the blue-phase liquid crystals in the later steps.

In block S207, the UV rays radiate the remaining photoresist adhesive so as to remove the photoresist adhesive. The soften photoresist adhesive are discharged via the through hole and/or the opening.

Figure 16:
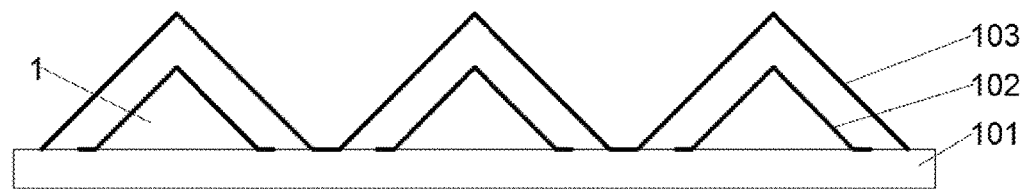
FIG. 16 is a schematic view showing the blue-phase liquid crystal panel after the coated photoresist adhesive is removed in the manufacturing method of the second embodiment.

Referring to FIG. 16, after the remaining photoresist adhesive is discharged, the blue-phase liquid crystal may be filled in the space. The first base 101, the first electrode layer 102, and the second electrode layer 103 cooperatively form the first substrate.

As shown in FIG. 16, the three ripple units constitute continuous wave structure. In another example, the wave structure may be discontinuous, and the wave structure may include more or less than three of the ripple units. In the embodiment, the wave structure is sawtooth-shaped. In other embodiments, the wave structure may be wedge-shaped, trapezium-shaped, circular-arc-shaped or a combination of other shapes.

As shown in FIG. 16, the inclined angles of the ripple units and the gaps between the first electrode layer 102 and the second electrode layer 103 are the same, which corresponds to the display panel in the first embodiment. In addition, by configuring different shapes of the first protrusion structure 1 and the second protrusion structure 3, the inclined angles and the gaps between the first electrode layer 102 and the second electrode layer 103, the display panel is divided into the transmission display area and the reflective display area, such that the phase delays of the light beams passing through the transmission display area and the reflective display area are the same. Further, the reflective layer is configured within the first base corresponding to the reflective display area so as to manufacture the transflective panel.

Figure 17:
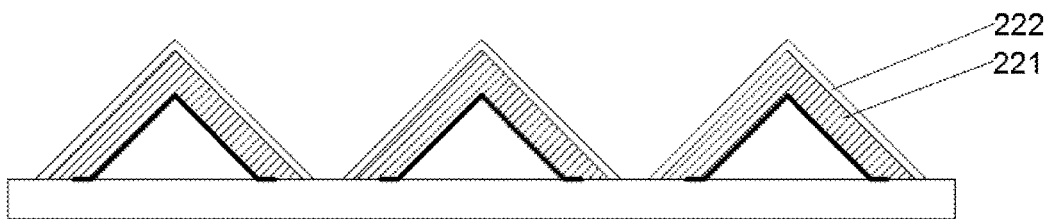
FIG. 17 is a schematic view showing the insulation layer formed on the second protrusion structure of the manufacturing method in accordance with one embodiment.
Figure 18:
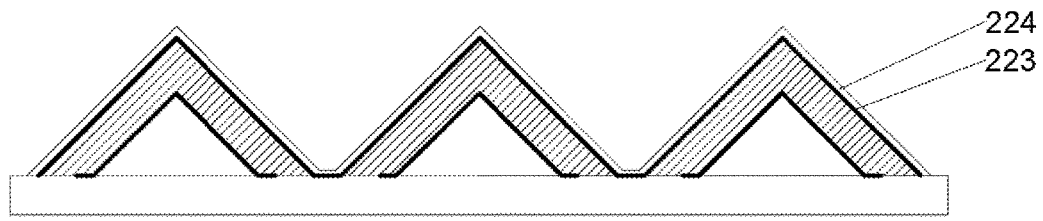
FIG. 18 is a schematic view showing the insulation layer formed on the second electrode layer of the manufacturing method in accordance with one embodiment.

Combining FIGS. 17 and 18, the manufacturing method of the blue-phase liquid crystal panel may form an insulation layer on the top surface and/or the down surface of the second electrode layer. In the embodiment, the manufacturing method may be combined with other embodiments.

As shown in FIG. 17, the first insulation layer 222 is formed on the top surface of the second protrusion structure 221. After this step, the second electrode layer is formed on the top surface of the first insulation layer 222 such that the first insulation layer 222 is below the down surface of the second electrode layer. Referring to FIG. 18, after forming the second electrode layer 223 on the surface of the second protrusion structure, the second insulation layer 224 is formed on the top surface of the second electrode layer 223.

The steps shown in FIGS. 17 and 18 may be executed to form two insulation layers, or may be executed to form one insulation layer. The first insulation layer 222 and the second insulation layer 224 may be made by materials such as resin to support the second electrode layer 223. During the step of etching the channel, the insulation layer and the second electrode layer 223 corresponding to the through hole or the opening are removed at the same time to form the channel.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A blue-phase liquid crystal display panel, comprising:
a first substrate and a second substrate parallel to the first substrate, the first substrate is spaced apart from the second substrate, the first substrate comprises a first base and a first electrode layer and a second electrode layer arranged close to one side of the second substrate, a first space is arranged between the first electrode layer and the second electrode layer, and a second space is arranged between the second electrode layer and the second substrate, and a channel is configured between the first space and the second space;
the first electrode layer cooperatively operates with the second electrode layer to form an electrical field within the first space and a component of the electrical field is parallel to the first substrate or the second substrate, the first electrode layer and the second electrode layer constitute a continuous or discontinuous wave structure having a plurality of ripple units, and the ripple unit comprises at least one first electrode unit and second electrode unit, the first electrode unit and the second electrode are configured to be concave-shaped and convex-shaped to engage with each other, the first electrode unit belongs to a first electrode layer, and the second electrode unit belongs to a second electrode layer, the channel is a through hole arranged on the second electrode layer, or openings at two ends of the ripple unit defined by the first electrode unit and the second electrode unit;

wherein the wave structure is sawtooth-shaped; and a portion of the ripple units is within a transmission display area, and the other portion of the ripple units is within a reflective display area, a first gap is configured between the first electrode layer and the second electrode layer within the reflective display area, a second gap is configured between the first electrode layer and the second electrode layer within the transmission display area, and the first gap is greater than the second gap, driving voltages and inclined angles of the ripple units within the transmission display area and the reflective display area are the same, and phase delays of light beams passing through the ripple units corresponding to the transmission display area and the reflective display area are the same.

2. A blue-phase liquid crystal display panel, comprising:

a first substrate and a second substrate parallel to the first substrate, the first substrate is spaced apart from the second substrate, the first substrate comprises a first base and a first electrode layer and a second electrode layer arranged close to one side of the second substrate, a first space is arranged between the first electrode layer and the second electrode layer, and a second space is arranged between the second electrode layer and the second substrate, and a channel is configured between the first space and the second space; and a plurality of blue-phase liquid crystals distributed within the first space and the second space;

the first electrode layer cooperatively operates with the second electrode layer to form an electrical field within the first space and a component of the electrical field is parallel to the first substrate or the second substrate.

3. The blue-phase liquid crystal display panel as claimed in claim 2, wherein the first electrode layer and the second electrode layer constitute a continuous or discontinuous wave structure having a plurality of ripple units, and the ripple unit comprises at least one first electrode unit and second electrode unit, the first electrode unit and the second electrode are configured to be concave-shaped and convex-shaped to engage with each other, the first electrode unit belongs to a first electrode layer, and the second electrode unit belongs to a second electrode layer, the channel is a through hole arranged on the second electrode layer, or openings at two ends of the ripple unit defined by the first electrode unit and the second electrode unit.

4. The blue-phase liquid crystal display panel as claimed in claim 3, wherein the wave structure is sawtooth-shaped.

5. The blue-phase liquid crystal display panel as claimed in claim 3, wherein at least one ripple unit is within a transmission display area, and the other ripple units are within a reflective display area, a first gap is configured between the first electrode layer and the second electrode layer within the reflective display area, a second gap is configured between the first electrode layer and the second electrode layer within the transmission display area, and the first gap is greater than the second gap, driving voltages and inclined angles of the ripple units within the transmission display area and the reflective display area are the same, and phase delays of light beams passing through the ripple units corresponding to the transmission display area and the reflective display area are the same.

6. The blue-phase liquid crystal display panel as claimed in claim 3, wherein at least one ripple unit is within a transmission display area, and the other ripple units are within a reflective display area, an inclined angle of the ripple units corresponding to the reflective display area is smaller than the inclined angle of the ripple units corresponding to the transmission display area, driving voltages of the ripple units corresponding to the transmission display area and the reflective display area are the same, a first gap is configured between the first electrode layer and the second electrode layer within the reflective display area, a second gap is configured between the first electrode layer and the second electrode layer within the transmission display area, and the first gap equals to the second gap, and phase delays of light beams passing through the ripple units corresponding to the transmission display area and the reflective display area are the same.

7. The blue-phase liquid crystal display panel as claimed in claim 3, wherein a portion of the ripple unit is a transmission display area, and the other portion of the ripple unit is a reflective display area, a first gap is configured between the first electrode layer and the second electrode layer within the reflective display area, a second gap is configured between the first electrode layer and the second electrode layer within the transmission display area, and the first gap is greater than the second gap, driving voltages and inclined angles within the transmission display area and the reflective display area are the same, and phase delays of light beams passing through the transmission display area and the reflective display area are the same.

8. The blue-phase liquid crystal display panel as claimed in claim 3, wherein a portion of the ripple unit is a transmission display area, and the other portion of the ripple unit is a reflective display area, an inclined angle of the ripple unit within the reflective display area is smaller than that within the transmission display area, and driving voltages corresponding to the transmission display area and the reflective display area are the same, a first gap is configured between the first electrode layer and the second electrode layer within the reflective display area, a second gap is configured between the first electrode layer and the second electrode layer within the transmission display area, and the first gap equals to the second gap, and phase delays of light beams passing through the transmission display area and the reflective display area are the same.

9. The blue-phase liquid crystal display panel as claimed in claim 3, wherein the first substrate further comprises a first protrusion structure arranged between the first electrode layer and the first base, and an insulation layer arranged on at least one surface of the second electrode layer.

10. A manufacturing method of the blue-phase liquid crystal display panels, comprising:

arranging a first electrode layer and a second electrode layer on a first base in sequence to form a first substrate, and a non-seal first space is arranged between the first electrode layer and the second electrode layer for receiving blue-phase liquid crystals;

fixing a second substrate on one side of the first base on which the second electrode layer is formed, arranging a second space between the second electrode layer and the second substrate, and configuring a channel between the first space and the second space;

filling the blue-phase liquid crystals into the second space, and the blue-phase liquid crystals enter the first space via the channel; and wherein the first electrode layer cooperatively operates with the second electrode layer to form an electrical field within the first space and a component of the electrical field is parallel to the first substrate or the second substrate.

11. The manufacturing method as claimed in claim 10, wherein the step of arranging a first electrode layer, and a second electrode layer on a first base in sequence to form the first substrate further comprises:

forming a first protrusion structure on the first base;

forming the first electrode layer on a surface of the first protrusion structure;

coating photoresist adhesive on the first base, a height of the photoresist adhesive is greater than that of the first protrusion structure;

arranging a mask having patterns on the photoresist adhesive, radiating a portion of the mask without patterns by ultraviolet rays along at least two different directions to soften the photoresist adhesive, removing the mask, and stripping the softened photoresist adhesive to form a second protrusion structure, the second protrusion structure is formed by the remaining photoresist adhesive and the second protrusion structure wraps up the first protrusion structure;

forming the second electrode layer on a surface of the second protrusion structure;

etching a through hole on the second electrode layer and/or etching the first protrusion structure, the first electrode layer, the second protrusion structure, and the second electrode layer to form the opening; and radiating the remaining photoresist adhesive by the ultraviolet rays to remove the remaining photoresist adhesive, the soften photoresist adhesive are discharged via the through hole and/or the opening, and the first base, the first electrode layer and the second electrode layer cooperatively constitute the first substrate.

12. The manufacturing method as claimed in claim 11, wherein before the step of forming the second electrode layer on the surface of the second protrusion structure further comprises:

forming an insulation layer on the surface of the second protrusion structure;

and/or after the step of forming the second electrode layer on the surface of the second protrusion structure, the method further comprises:

forming the insulation layer on the surface of the second electrode layer.

* * * * *